United States Patent
Anders et al.

(10) Patent No.: US 6,439,641 B1
(45) Date of Patent: Aug. 27, 2002

(54) WINDOW SEAL FOR A CONVERTIBLE

(75) Inventors: Jens Anders, Marienhagen; Martin Gentemann, Harsum, both of (DE)

(73) Assignee: Meteor Gummiwerke K.H. Bädje GmbH & Co., Bockenem (DE)

(*) Notice: Subject to any disclaimer, the term of this patent is extended or adjusted under 35 U.S.C. 154(b) by 0 days.

(21) Appl. No.: 09/856,240
(22) PCT Filed: Sep. 8, 2000
(86) PCT No.: PCT/EP00/08764
§ 371 (c)(1),
(2), (4) Date: May 17, 2001
(87) PCT Pub. No.: WO01/21425
PCT Pub. Date: Mar. 29, 2001

(30) Foreign Application Priority Data

Sep. 17, 1999 (DE) .................................... 299 16 383 U

(51) Int. Cl.⁷ ................................................ B60J 10/04
(52) U.S. Cl. ............................... 296/107.04; 296/107.05
(58) Field of Search ....................... 296/107.05, 107.07, 296/146.14, 146.9, 107.04; 49/499.1, 475.1

(56) References Cited

U.S. PATENT DOCUMENTS

| | | | |
|---|---|---|---|
| 5,527,583 A | 6/1996 | Nozaki et al. .............. | 428/99 |
| 5,601,329 A | * 2/1997 | Glagow et al. ........ | 296/146.14 |
| 6,030,022 A | * 2/2000 | Bormann et al. ...... | 296/107.04 |

FOREIGN PATENT DOCUMENTS

| | | | | |
|---|---|---|---|---|
| DE | 43 14 192 A1 | 11/1994 | | |
| DE | 693 11 456 T2 | 1/1998 | | |
| EP | 0 581 389 A1 | 2/1994 | | |
| EP | 618101 | * 10/1994 | .............. | 296/146.9 |
| WO | WO 97/00180 | 1/1997 | | |

* cited by examiner

Primary Examiner—Dennis H. Pedder
(74) Attorney, Agent, or Firm—Synnestvedt & Lechner LLP

(57) ABSTRACT

The profiled seal which is provided to produce a sealing arrangement between a vertically sliding window pane and a roof frame of a cabriolet comprises a metal carrier rail and a length of profiled elastomer co-extruded with the carrier rail. The profiled seal has a three-dimensional shape and can be attached to connection parts of the roof frame by attachment elements. At least two assembly regions of the carrier rail which protrude out of the length of profiled elastomer transversely to the longitudinal direction and cooperate with the attachment elements are provided disposed in the longitudinal direction of the profiled seal at a mutually spaced disposition.

20 Claims, 6 Drawing Sheets

WINDOW SEAL FOR A CONVERTIBLE

BACKGROUND OF THE INVENTION

The invention relates to a profiled seal for providing a sealing arrangement between a vertically sliding window pane and a roof frame of a cabriolet.

In the case of a known profiled seal of this type (WO 97/00180 A1; FIGS. 2, 3, 6 and 7) the window pane comes into contact with two opposite lying sealing lips. The sealing lips form longitudinal edges of the length of profiled elastomer. The attachment elements penetrate the length of profiled elastomer and the carrier rail and are mounted through the sealing lips on the connection part. It is possible for dust and/or moisture to collect in an undesired manner above the sealing lips inside the profiled seal. Moreover, it is necessary to cut the profiled seal into sections and each section must be stretch-bent into the required three-dimensional shape using costly tools.

It is known per se to produce a holding rail as an extruded aluminum profile, to stretch-bend it into the desired three-dimensional shape and to attach it by means of attachment elements to the connection part. Only then is the length of profiled elastomer inserted on the motor vehicle assembly line into the receiving devices on both sides of the holding rail. This is time-consuming and costly.

A profiled seal is known per se from U.S. Pat. No. 5,527,583 A (FIGS. 12A and 12B) for providing a sealing arrangement between a vertically sliding window pane and a roof frame of a limousine, wherein a rubber seal is pushed onto an attachment rail of a formed part and attached thereto by means of an adhesive strip on both sides. The formed part comprises for the attachment to the roof frame tabs which do not protrude beyond the rubber seal so that it is first necessary to attach the formed part and then in a further operational step to attach the rubber seal.

Moreover, a cladding assembly for motor vehicle doors and comprising profiled seals is known per se from DE 693 11 456 T2 (FIG. 7) for providing a sealing arrangement between a vertically sliding window pane and the door, wherein tabs are provided for he purpose of attaching a stay-piece, which receives a profiled seal, to a door inner wall. The tabs are thus not part of a profiled seal carrier rail which serves as a reinforcing and fixing means.

SUMMARY OF THE INVENTION

The object of the invention is to simplify and improve the profiled seal and its assembly.

This object is achieved with a profiled seal for providing a sealing arrangement between a vertically sliding window pane and a roof frame of a cabriolet. The profiled seal includes a metal carrier rail and a length of profiled elastomer which is co-extruded with the carrier rail, and wherein the profiled seal has a three-dimensional shape and can be fixed on connection parts of the roof frame by attachment elements. At least two assembly regions of the carrier rail protrude out of the length of profiled elastomer transverse to the longitudinal direction, which assembly regions are disposed at a mutually spaced disposition in the longitudinal direction of the profiled seal and cooperate with the attachment elements. The roof associated with the roof frame can be a folding cover or a multi-part hard folding roof. The roof frame can optionally also comprise the A-column of the cabriolet. The carrier rail consists preferably of sheet metal and is for example manufactured from aluminum, steel or stainless steel. The length of profiled elastomer is optionally co-extruded from a plurality of different elastomers. The profiled seal is preferably produced such that first the strip-shaped, planar carrier rail is extruded within the length of profiled elastomer. In so doing, however, a strip of carrier rail containing the assembly regions does protrude at the side from the length of profiled elastomer. This strip is stamped after the co-extrusion, such that assembly regions remain while holes are produced to receive the attachment elements. If required, the assembly regions can moreover be bent into the final assembly position. It is not necessary to stretch-bend the profiled seal produced in this manner. On the contrary, the profiled seal is attached directly to the connection part of the roof frame by way of the assembly regions. As a consequence of the punched out areas adjacent to the assembly regions the profiled seal can be bent very easily about a transverse axis into a final three-dimensional shape and can be assembled in this shape on to the connection part.

The cost of assembly at the production line of the cabriolets is considerably reduced. Moreover, the hitherto necessary considerable costs for the stretch-bending process are no longer incurred.

Additional features include removal of the metal material of the carrier rail, which material is originally disposed in the longitudinal direction adjacent to the assembly regions. These features enable the assemble regions to be produced rapidly and in a precise manner from the edge strip of the carrier rail left free during the co-extrusion from the elastomer material.

In accordance with another embodiment, the assembly regions are bent relative to the remainder of the carrier rail in a position which is favorable for the assembly process. Here, the assembly regions can be bent into any desired position favorable for the assembly.

In another embodiment, the length of profiled elastomer includes a foot which cooperates in a sealing manner with the closure part. The foot includes a longitudinal groove on a first longitudinal edge remote from the assembly regions. A dimensionally stable edge flange of a roof of the cabriolet engages in the longitudinal groove. These features enable the foot to be held against the connection part in a particularly good and defined sealing position.

In another embodiment, the edge flange is a component of an outer metal sheet of a roof part of a hard folding roof. In yet another embodiment, the edge flange is a component of a closure strip, and a longitudinal edge of a cover material of a folding roof cover is fixed on the associated closure part of the roof frame by means of the closure strip. In accordance with these embodiments, the available rigid edge flange is sufficient to reliably hold the foot.

The foot can include outside the longitudinal groove a sealing lip which lies prestressed in a sealing manner against the roof. These features enhance the sealing arrangement of the associated gap against moisture and noise.

In another embodiment, a limb of the length of profiled elastomer extends outwards at an angle from a second longitudinal edge of the foot adjacent to the assembly regions. A membrane of the length of profiled elastomer is attached between a free longitudinal edge of the limb and the first longitudinal edge of the foot and forms a hollow cavity in the length of profiled elastomer. In accordance with these features, a hollow cavity is produced in the length of profiled elastomer and this cavity partly receives the window pane as it closes. As this hollow cavity is normally hermetically sealed, neither dust nor moisture can penetrate into the hollow cavity and adversely affect the window pane.

In accordance with an embodiment where the window pane comes into sealing contact with the membrane when the pane is in the uppermost region of its travel, a good sealing arrangement is produced between the closed window pane and the membrane.

In accordance with an embodiment where the foot and the limb consist of soft rubber and the membrane consists of expanded rubber, the soft rubber can have a hardness of 60 Shore A and the expanded rubber can have a hardness of for example 15 Shore A. Soft rubber and expanded rubber are preferably co-extruded together with the carrier rail using the duplex method.

The carrier rail can extend in a foot of the length of profiled elastomer, which foot cooperates in a sealing manner with the closure part. These features serve to reinforce the foot and promote the sealing position of the foot against the connection part.

In accordance with an embodiment where the carrier rail extends in the limb of the length of profiled elastomer, the limb is reinforced which correspondingly increases the deformation resistance of the limb when the window pane is received into the hollow cavity of the length of profiled elastomer.

The features of an embodiment where the carrier rail is provided with cut-outs on its longitudinal edge disposed in the length of profiled elastomer, allows the profiled seal to be bent about a vertical axis when the installation situation demands this. The cut-outs are expediently produced in the longitudinal edge of the carrier rail prior to the co-extrusion process.

BRIEF DESCRIPTION OF THE DRAWINGS

This and other advantages and features of the invention are explained hereinunder in detail with reference to the exemplified embodiments illustrated in the drawings, in which.

DETAILED DESCRIPTION

Figure 1:
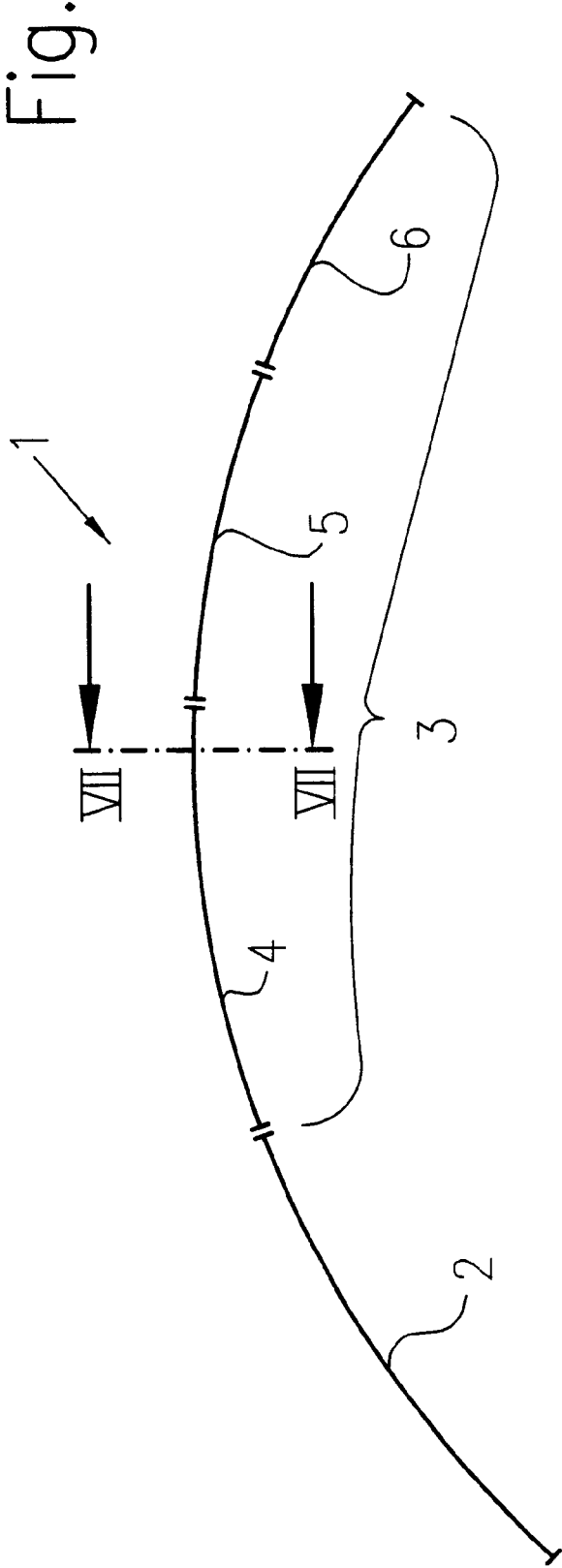
FIG. 1 schematically illustrates the roof region of a cabriolet with a folding cover, FIG. 2 schematically illustrates the roof region of a cabriolet with a hard folding roof.

Referring to FIG. 1, a roof frame 1 of a cabriolet in a schematic illustration comprises an A-column 2 and a three-part folding cover 3 comprising a roof frame I 4, a roof frame II 5 and a roof frame III 6.

Like parts are provided with like numerals in all figures in the drawings.

Figure 2:
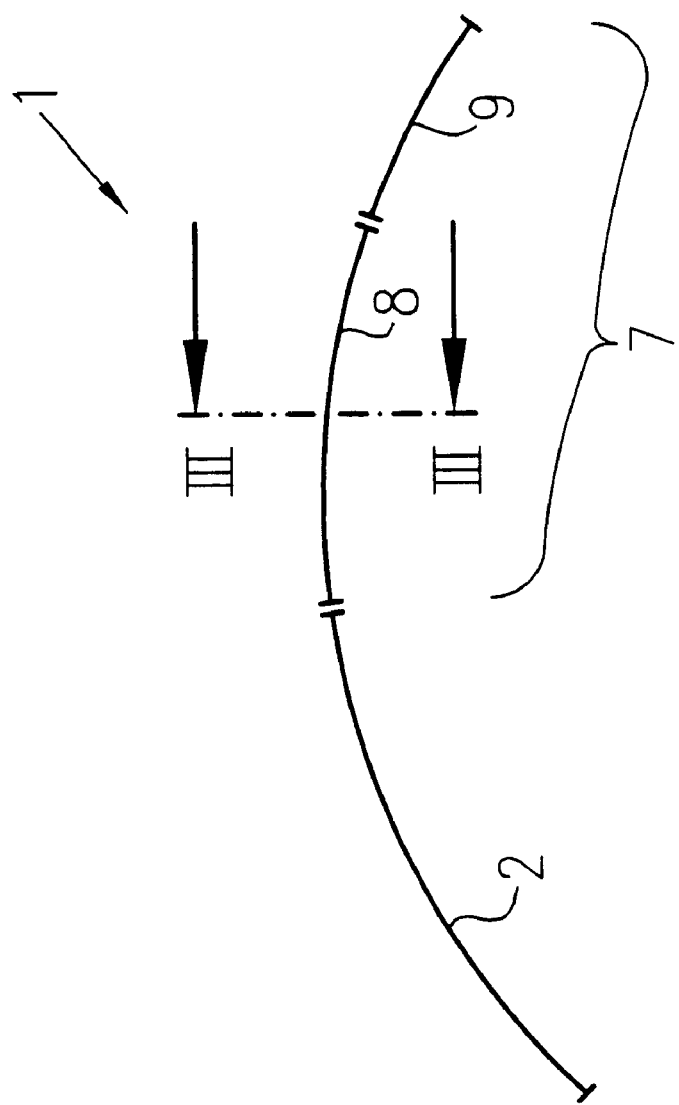

FIG. 2 illustrates the roof frame 1 of a cabriolet which comprises the A-column 2 and a two-part hard folding roof 7 comprising a roof frame I 8 and a roof frame II 9.

Figure 3:
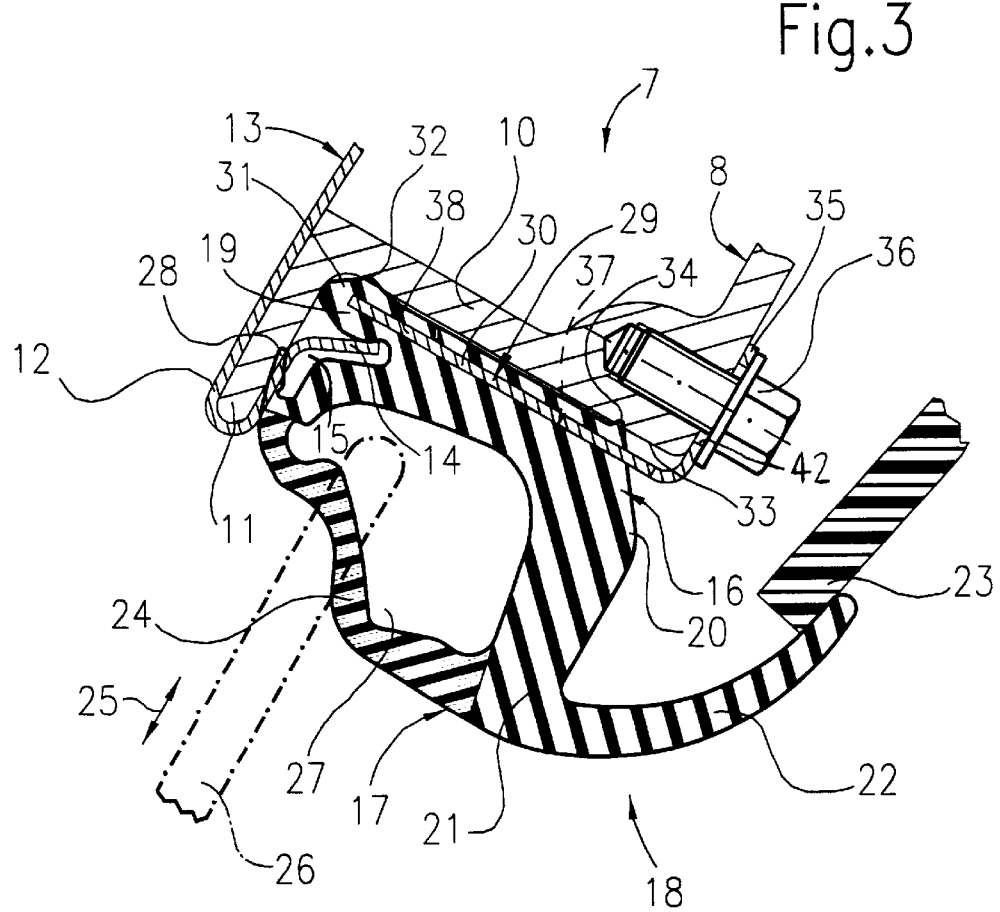
FIG. 3 illustrates the enlarged sectional view according to line III—III in FIG. 2.

As shown in FIG. 3, the roof frame I 8 is provided with a three-dimensional connection part 10 which consists for example of cast aluminum. A lacquered, visible outer metal sheet 12 of an associated roof part 13 of the folding roof 7 surrounds a flange 11 of the connection part 10. The outer metal sheet 12 comprises an inwardly curved, dimensionally stable edge flange 14 which engages in a longitudinal groove 15 in a foot 16 of a length of profiled elastomer 17 of a profiled seal 18.

The outer metal sheet 12 can for example be adhered to the flange 11. The longitudinal grove 15 is formed in a first longitudinal edge 19 of the foot 16. A limb 21 of the length of profiled elastomer 17 extends outwards at an angle approx. 90° from an opposite lying second longitudinal edge 20 of the foot 16. A cover lip 22 is formed as one on the free longitudinal edge of the limb 21 and cooperates with an inner cladding 23 of the roof part 13, which inner cladding is to be assembled at the end. The foot 16, the limb 21 and the cover lip 22 consist of soft rubber. A membrane 24 of the length of profiled elastomer is attached between the free longitudinal edge of the limb 21 and the first longitudinal edge 19 of the foot 16. The membrane 24 consists in this case of expanded rubber and cooperates in a sealing manner with a side window pane 26 of the cabriolet, which side window slides vertically in the directions of the double arrow 25. FIG. 3 illustrates the window pane 26 by the dot-dash line in its closed end position, whereas the membrane 24 is still illustrated in its unloaded starting position. A hollow cavity 27 is provided in the inside of the length of profiled elastomer 17. Outside the longitudinal groove 15, a sealing lip 28 which lies prestressed in a sealing manner against the outer metal sheet 12 and/or on its edge flange 14 is formed as one on the first longitudinal edge 19 of the foot 16. The sealing lip 28 likewise consists of soft rubber.

A carrier rail 29 which consists of sheet metal is connected to the length of profiled elastomer 17 by means of co-extrusion. As shown in FIG. 3, a part 30 of the carrier rail 29 is formed as one in the foot 16 and extends as far as into a sealing edge 31 on the first longitudinal edge 19 of the foot 16. The sealing edge 31 lies prestressed on the one side against the edge flange 14 and on the other side with a sealing rib 32, likewise prestressed, against a sealing surface 33 of the connection part 10. The sealing edge 31 and the sealing rib 32 are held by the edge flange 14 in a good sealing position against the sealing surface 33. The foot 16 with a sealing rib 34 is moved into a particularly good sealing contact with the sealing surface at its second longitudinal edge 20. This is achieved by virtue of the fact that the tab-like assembly regions 35 of the contract rail 29, which protrude out of the foot 16, in the case of FIG. 3 are angled at an angle of 90° and are screwed to the connection part 10 by way of attachment elements 36 which are formed as screws. Each screw 36 penetrates a bore 42 in the associated assembly region 35. A radial clearance exists between the screw 36 and the bore 42 which clearance can be used during the assembly process to adjust the profiled seal 18 relative to the connection part 10.

The carrier rail 29 is provided on its longitudinal edge disposed in the length of profiled elastomer 17 with cut-outs 37.

Figure 4:
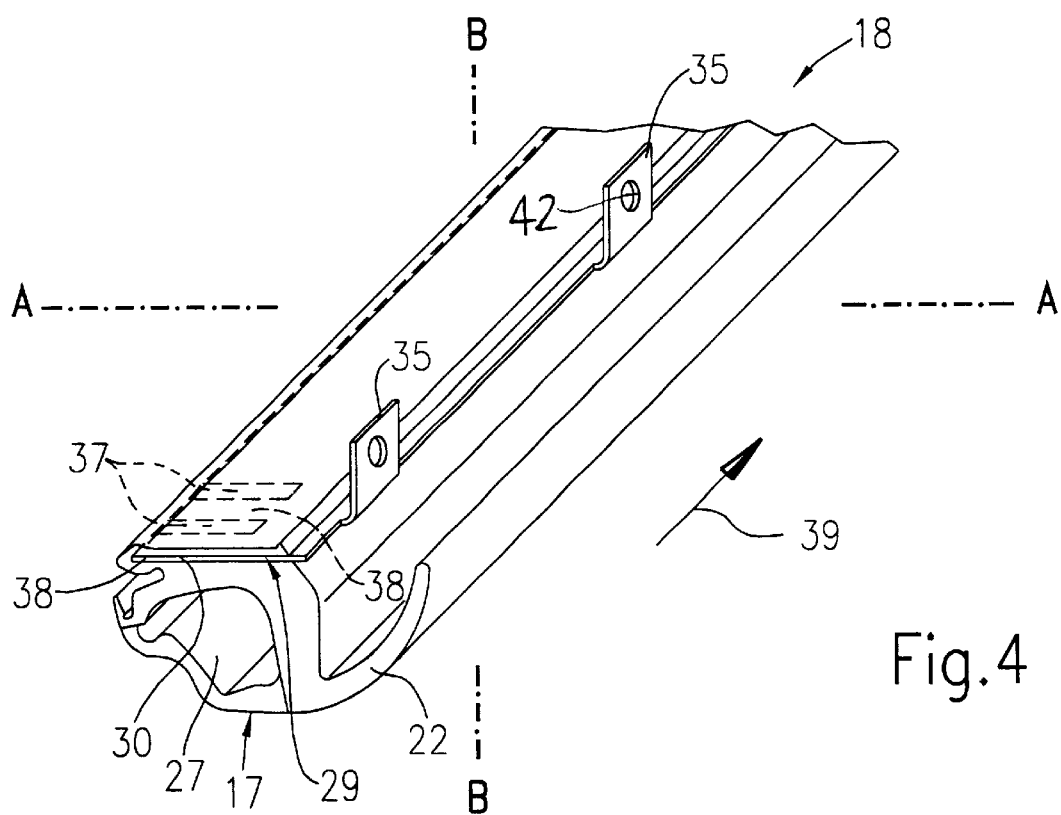
FIG. 4 shows a reduced scale, perspective illustration of the profiled seal in accordance with FIG. 3.

Referring to FIG. 4, two of these cut-outs 37 are illustrated as examples by a broken line. The cut-outs 37 are disposed alternately with tongues 38 of the part 30 over the entire length of the part 30 in a longitudinal direction 39 (FIG. 4) of the profiled seal 18.

As shown in FIG. 4, the material 43 (FIG. 8) of the carrier rail 29 disposed originally in the longitudinal direction 39 adjacent to the assembly regions 35, 35 is removed, for example punched out. As a consequence, the profiled seal 18 can be bent comparatively easily about a horizontal transverse axis A—A for the purpose of adjusting to the installation situation. On the other hand, the cut-outs 37 allow the profiled seal 18 to be bent comparatively easily about a vertical axis B—B. The cut-outs 37 are then only necessary when in the end the profile seal 18 must also be bent during the assembly about the vertical axis B—B.

Figure 5:
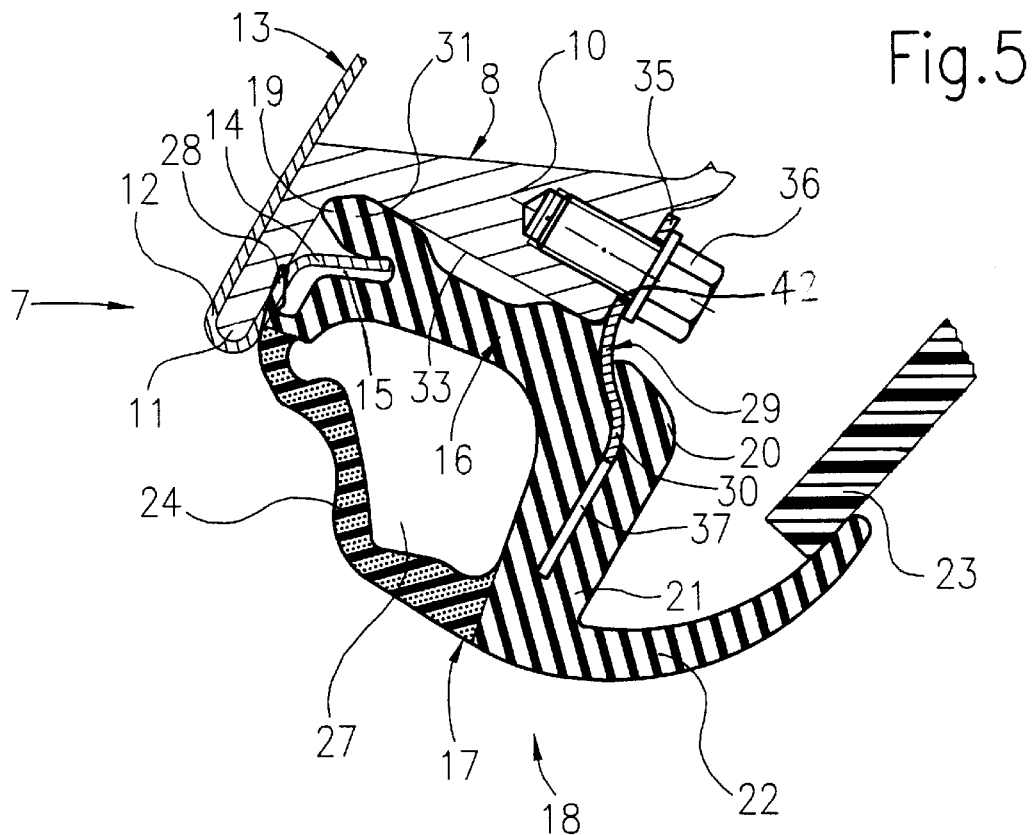
FIG. 5 illustrates a sectional view according to FIG. 3 through another embodiment of the profiled seal.
Figure 6:
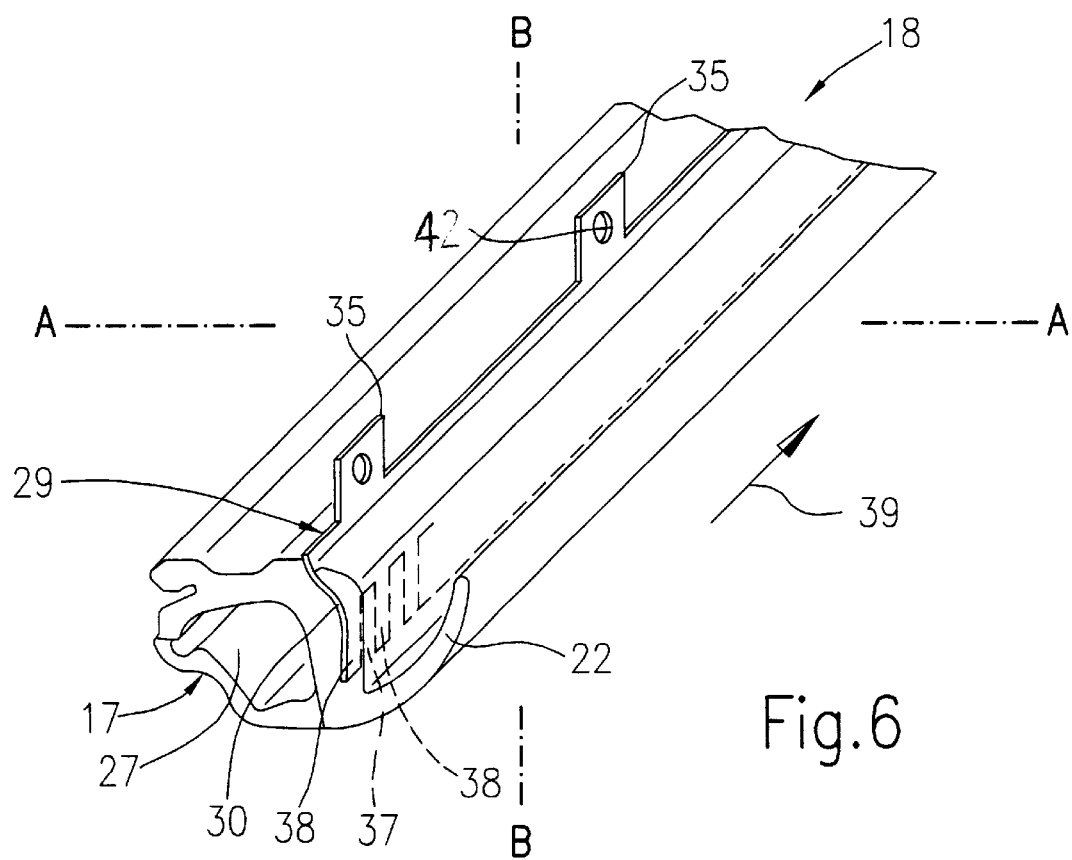
FIG. 6 shows a reduced scale, perspective illustration of the profiled seal in accordance with FIG. 5.

The embodiment illustrated in FIGS. 5 and 6 differs with respect to that illustrated in FIGS. 3 and 4 above all by virtue of the fact that the carrier rail 29 no longer extends in the foot 16, but rather extends in the limb 21. It is also possible here if required to provide cut-outs 37 alternating with tongues 38 on the longitudinal edge of part 30 of the carrier rail 29. The bores 42 comprise here practically no radial clearance with respect to the screw 36 which simplifies the assembly of the profiled seal 18.

Figure 7:
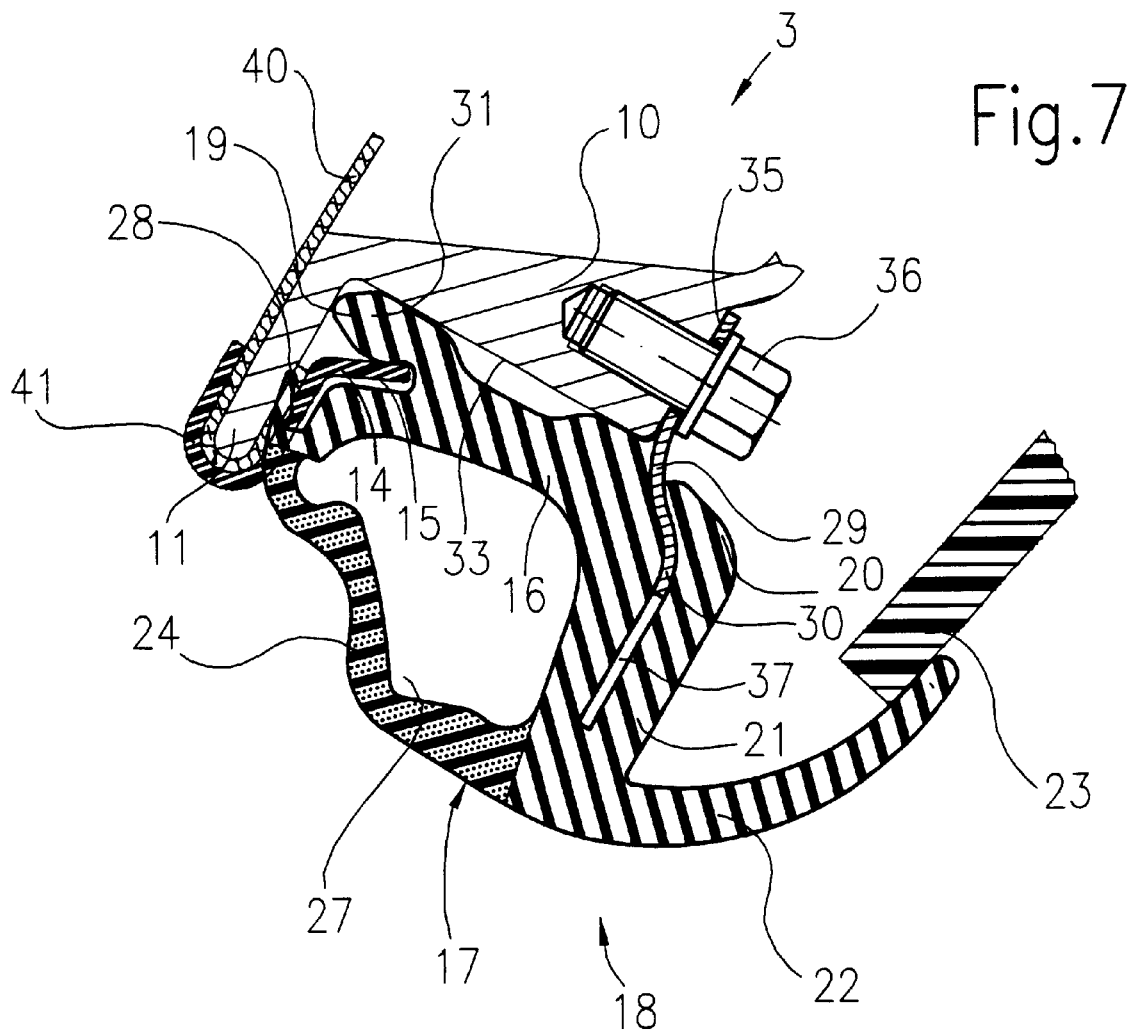
FIG. 7 illustrates an enlarged cross-sectional view in accordance with line VII—VII in FIG. 1 and FIGS. 8 and 9 illustrate respectively the plan view of different carrier rails.

The embodiment in accordance with FIG. 7 is similar to that as shown in FIGS. 5 and 6. However, FIG. 7 illustrates a cross-section through the roof frame I 4 of the folding roof cover 3 as shown in FIG. 1.

A longitudinal edge of a cover material 40 is drawn around the flange 11 and held in this position by means of a closure strip 41 manufactured in synthetic material. The closure strip 41 can for example be stitched to the cover material 40. In this case, the sealing lip 28 cooperates in a sealing manner with the closure strip 41. The edge flange 14 is formed as one piece with the closure strip 41.

Figure 8:
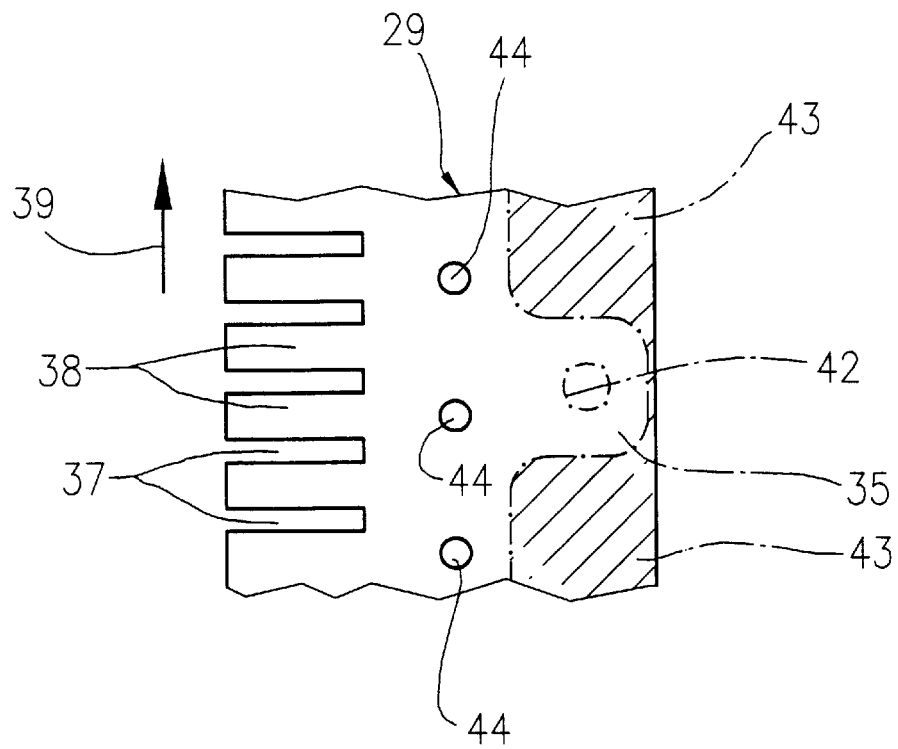

FIG. 8 illustrates the plan view of the carrier rail 29 used in accordance with FIGS. 3 and 4. The carrier rail 29 is in this state still planar and has the contour illustrated by the bold line. In other words, the cut-outs 37 and extrusion holes 44 are already provided prior to the carrier rail 29 being introduced in this form to the extrusion head of an extruder for co-extrusion with the profile seal 18. In preference the configuration of the carrier rail 29 indicated on the right hand side of FIG. 8 by the dot-dash line is only produced after this co-extrusion. In so doing, the material 43 disposed in the longitudinal direction 39 adjacent to the assembly regions 35 and the bores 42 are simultaneously punched out. Finally, the assembly regions 35 are bent by approx. 90° with respect to the remainder of the carrier rail 29, as is evident from FIGS. 3 and 4.

Figure 9:
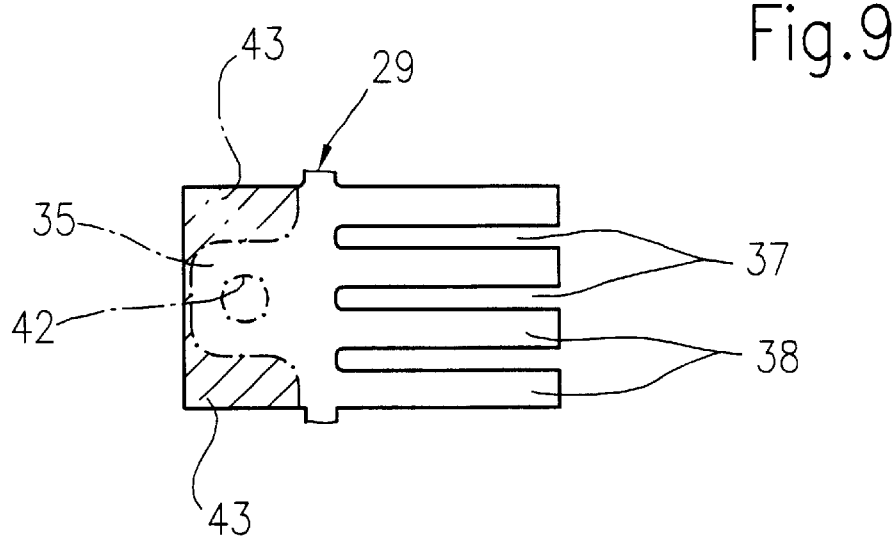

FIG. 9 illustrates the plan view of a carrier rail 29, as can be used in accordance with FIGS. 5 to 7. The production and processing of this carrier rail 29 are substantially the same as those relating to FIG. 8.

What is claimed is:

1. A profiled seal for providing a sealing arrangement between a vertically sliding window pane and a roof frame of a cabriolet, said profiled seal comprising:
   a metal carrier rail and a length of profiled elastomer which is co-extruded with the carrier rail;
   said profiled seal having a three-dimensional shape that can be fixedly attached to a connection part of the roof frame by attachment elements; and
   wherein said carrier rail has at least two assembly regions which protrude out of said length of profiled elastomer transverse to a longitudinal direction of said profiled seal, which assembly regions are disposed at a mutually spaced disposition in said longitudinal direction and cooperate with said attachment elements.

2. A profiled seal in accordance with claim 1 wherein said carrier rail is formed with the removal of metal material therefrom, said material being originally disposed in the longitudinal direction adjacent to said assembly regions.

3. A profiled seal in accordance with claim 1 wherein said assembly regions are bent relative to a remainder of said carrier rail in a position which is favorable for the assembly process.

4. A profiled seal in accordance with claim 2 wherein said assembly regions are bent relative to a remainder of said carrier rail in a position which is favorable for the assembly process.

5. A profiled seal in accordance with claim 1 in combination with said connection part, wherein said length of profiled elastomer comprises a foot which cooperates in a sealing manner with the connection part, said foot comprising a longitudinal groove on a first longitudinal edge remote from said assembly regions, said longitudinal groove configured to engagingly receive a dimensionally stable edge flange of the roof of the cabriolet.

6. A profiled seal combination in accordance with claim 5 wherein said edge flange is a component of an outer metal sheet of a roof part of a hard folding roof.

7. A profiled seal combination in accordance with claim 5 further comprising;
   a closure strip of which said edge flange is a component; and
   a cover material of a folding roof cover, said cover material having a longitudinal edge which is fixedly attached on the connection part by means of said closure strip.

8. A profiled seal combination in accordance with claim 5 wherein said foot comprises outside said longitudinal groove a sealing lip which lies prestressed in a sealing manner against the roof.

9. A profiled seal combination in accordance with claim 6 wherein said foot comprises outside said longitudinal groove a sealing lip which lies prestressed in a sealing manner against the roof.

10. A profiled seal combination in accordance with claim 5 wherein
   said length of profiled elastomer has a limb extending outwards at an angle from a second longitudinal edge of the foot adjacent to the assembly regions, and
   said length of profiled elastomer has a membrane attached between a free longitudinal edge of the limb and the first longitudinal edge of the foot and forms a hollow cavity in the length of profiled elastomer.

11. A profiled seal combination in accordance with claim 10 wherein said membrane is positioned to come into sealing contact with said window pane when said pane is in its uppermost region of travel.

12. A profiled seal combination in accordance with claim 10 wherein the foot and the limb consist of soft rubber and the membrane consists of expanded rubber.

13. A profiled seal combination in accordance with claim 11 wherein the foot and the limb consist of soft rubber and the membrane consists of expanded rubber.

14. A profiled seal combination in accordance with claim 1 wherein the length of profiled elastomer comprises a foot, and wherein said carrier rail extends in said foot, which foot is for cooperating in a sealing manner with the connection part.

15. A profiled seal combination in accordance with claim 2 wherein the length of profiled elastomer comprises a foot, and wherein said carrier rail extends in said foot, which foot is for cooperating in a sealing manner with the connection part.

16. A profiled seal combination in accordance with claim 5 wherein the length of profiled elastomer comprises a foot, and wherein said carrier rail extends in said foot, which foot cooperates in a sealing manner with the connection part.

17. A profiled seal combination in accordance with claim 10 wherein the carrier rail extends in said limb of the length of profiled elastomer.

18. A profiled seal in accordance with claim 1 comprising cut-outs in said carrier rail on its longitudinal edge disposed in the length of the profiled elastomer.

19. A profiled seal in accordance with claim 2 comprising cut-outs in said carrier rail on its longitudinal edge disposed in the length of the profiled elastomer.

20. A profiled seal in accordance with claim 3 comprising cut-outs in said carrier rail on its longitudinal edge disposed in the length of the profiled elastomer.

* * * * *